Jan. 4, 1944.     J. L. WOODBRIDGE     2,338,389

FILLING AND VENTING STRUCTURE

Filed May 9, 1941

WITNESS:

INVENTOR

Joseph Lester Woodbridge
BY
Augustus B Stoughton
ATTORNEY.

Patented Jan. 4, 1944

2,338,389

UNITED STATES PATENT OFFICE 2,338,389

FILLING AND VENTING STRUCTURE

Joseph Lester Woodbridge, Philadelphia, Pa., assignor to The Electric Storage Battery Company, Philadelphia, Pa., a corporation of New Jersey Application May 9, 1941, Serial No. 392,599

8 Claims. (Cl. 136—178)

This invention relates to electric storage batteries of the type using a liquid electrolyte and has for its object the provision of an improved, low-cost filling and venting structure by which the over-filling of a battery of this type is prevented.

This application is a continuation in part of my application Serial No. 219,606, filed July 16, 1938, issued July 8, 1941, Patent No. 2,248,264.

In certain classes of service, especially for automobile starting and lighting, the storage battery is so designed and located that it is very difficult to fill it to the proper level on account of the fact that the level of the electrolyte cannot be seen during the filling operation until the cell has been over-filled. Therefore, the principal object of this invention is to prevent such over-filling under these conditions.

In general, the invention may be described broadly as consisting of a filling opening through the cover of the cell, provided with a depending tubular structure extending down to the maximum desired level of the electrolyte. Outside of the tube, between the surface of the electrolyte and the under surface of the cover, there is provided a space for trapped gas. In the absence of any vent, this trapped gas will prevent the electrolyte from rising into the space above the lower end of the said tube. If, under these conditions, the tube is filled with electrolyte up to a point where its upper surface can be observed, it will contain only a comparatively insignificant amount of electrolyte. If, thereafter, the space containing the trapped gas is vented into the atmosphere, the level of the excess electrolyte in the filling tube will fall to that in the cell outside of the filling tube without causing the latter to rise appreciably, and the cell will then have been filled to the desired level without any danger of overfilling.

In accordance with the present invention, the venting of the space under the cover and surrounding the filling tube is provided by openings through the wall of the filling tube close to the under side of the cover. A valve member is provided within the filling tube closely fitting its internal walls and arranged for limited axial travel within the tube whereby, in its upper position, the vent openings are uncovered, and, in its lower position, they are closed. The valve member is internally threaded to receive an externally threaded vent plug which, when screwed into place, raises the valve member into its upper position, this being the normal operating position wherein the vent openings in the filling tube are uncovered and the gases developed in the cell during operation are permitted to escape through the vent plug. When, however, the vent plug is unscrewed and removed, the valve member falls by its own weight to its lower position, closing the vent openings in the filling tube. The valve member is prevented from rotating in the filling tube and its vertical travel is limited by interengaging configurations of the wall of the filling tube and the external surface of the valve member.

The object of my design is to provide a minimum number of molded parts which can be produced at minimum cost and with the simplest type of molds. In prior devices, it is necessary to provide a separate collar which is screwed onto the lower end of the filling tube. This involves molding screw-threads on the external wall at the bottom of the filling tube and molding internal screw-threads on the internal wall of the upturned flange of the collar. The collar itself is a separate molded part, adding considerably to the cost of the completed structure.

In my design, the filling opening in the cover can be molded with minimum expense because there are no screw-threads involved. The internal projections can be readily formed by providing two plungers as integral parts of the top and bottom portion of the mold, meeting at the middle of the filling opening when the mold is closed, one of these plungers having cavities to provide for the projections. The plungers are therefore withdrawn when the two parts of the mold are separated and the finished article removed without further manipulation. Where screw-threads are to be provided either on the internal or the external wall of the filling tube, a much more complicated mold must be made and added labor is involved in unscrewing the finished article from the mold.

In addition, there is the advantage of making the valve member in my device of heavy material so that, when the vent cap is removed, it will fall by its own weight with certainty. If this member were made of light material such as hard rubber, it might easily be prevented from dropping by any light friction.

It is a further object of my invention to provide an improved construction by which the valve member of the venting structure may be readily inserted into or removed from the filling tube and when the valve is mounted within the filling tube, its axial movement relative to the tube will be limited so as to define an upper venting position and a lower non-venting position for the valve.

The invention will be more clearly understood by reference to the accompanying drawing in which.

Figure 1:
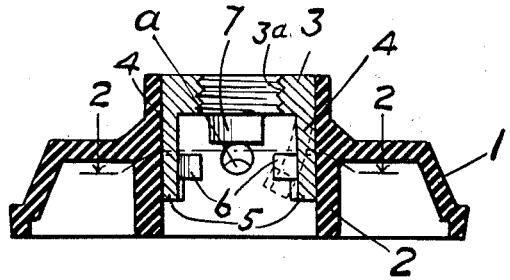
Fig. 1 is a vertical sectional view taken crosswise a cell and showing features of the invention with the valve member in the upper or open position.
Figure 2:
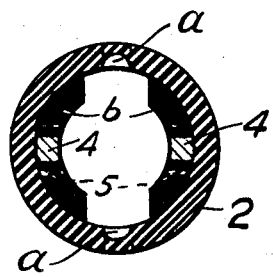
Fig. 2 is a longitudinal sectional view taken on the line 2—2 of Fig. 1.

Referring to the drawing, 1 represents a portion of the cover of a storage battery cell through which a filling and venting tube 2 extends, projecting above and below the cover proper and having vents a from its interior to the space just below the cover. 3 is a valve member, preferably of comparatively heavy material such as lead alloy, arranged to fit closely to the internal cylindrical walls of the filling tube 2.

The valve member 3 is provided with an axial opening internally threaded as at 3a. This perforated and internally threaded valve member 3 is provided with extensions 4 depending from its lower periphery, these extensions having lateral projections 5 at the bottom.

Figure 3:
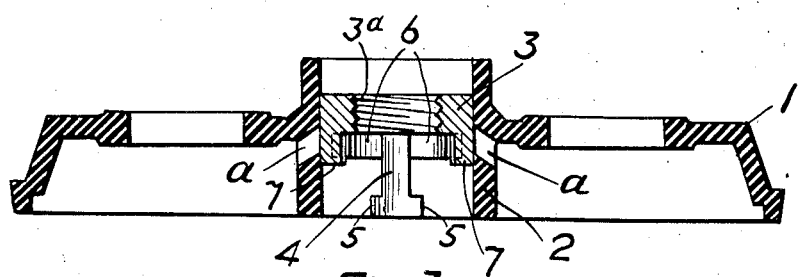
Fig. 3 is a vertical sectional view taken lengthwise of the cell with the valve member in the lower or closed position.

The inner wall of the filling tube 2 is provided with interrupted, annular projections 6, in the spaces between which the extensions 4 are free to slide vertically. The downward motion of the valve member 3 is limited when it rests on these internal projections 6 as shown in Fig. 3, and the upward motion is limited when the projections 5 come in contact with the under side of the projections 6 as shown in Fig. 1. The spaces between the projections 6 define a trackway for the extensions 4 and the interengagement between the extensions 4 and the projections 6 prevent any substantial rotation of the valve member 3.

From the lower periphery of the valve member 3, two other diametrically opposite extensions 7 are provided which, in the lower position of the valve member, pass down through corresponding openings between the projections 6 and close the vent openings a as shown in Fig. 3. When the valve member is raised to its upper position, the extensions 6 are raised sufficiently to uncover the vent openings a as shown in Fig. 1.

In order to make it possible to insert the valve member 3 in the vent tube 2 after it has been molded with the projections 6 therein, the extensions 4 are so designed as to be readily deformable. In the specific embodiment of my invention shown in the drawing, the extensions are integrally formed with the valve member 3 and are so proportioned that they may be deformed. Thus in assembling the vent and filling structure, the extensions 4 may be bent inwardly as shown by the dotted lines in Fig. 1 and then bent back into their normal positions after the projections 5 on the ends of the extensions 4 have passed below the projections 6 on the inner wall of the vent tube 2.

Figure 4:
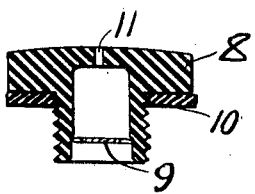
Fig. 4 is an elevation in section of the vent plug.

The internally threaded portion of the valve 3 is adapted to receive the externally threaded, downwardly extending portion of the vent plug 8 which is provided with the usual baffle 9 as shown in Fig. 4. When the vent plug 8 is unscrewed and removed from the valve member 3, the valve member falls by its own weight into the position shown in Fig. 3, in which the extensions 7 close the vent openings a in the walls of the filling tube 2. In this position of the valve member the cell may be filled through the opening in the valve until the liquid in the cell reaches the lower end of the filling tube 2. When this level is reached, the liquid cannot rise any further in the cell by reason of the gas trapped beneath the cover outside of the filling tube. Any further filling will bring the level of the liquid in the filling tube to a point where it will be visible and the filling can be stopped. Now, when the vent plug 8 is again inserted and screwed into the valve member, the latter will be drawn upward until it reaches the position shown in Fig. 1 with the projections 5 bearing upwardly against the projections 6. Any further turning of the vent plug 8 will compress the soft rubber gasket 10, producing a tight seal between the overhanging cap of the vent plug and the upper periphery of the filling tube 2. When the valve member 3 is in its upper position shown in Fig. 1, the extensions 7 no longer cover the vent openings a and the gases developed in the cell may escape through the vent openings a into the open portion of the valve and thence through the passage 11 provided in the vent plug to the open air.

It will be obvious to those skilled in the art that modifications may be made in details of construction of my invention without departing from the spirit thereof, and it is, therefore, intended in the appended claims to cover all such modifications as are within the true spirit and scope of this invention.

I claim:

1. In a storage battery cell containing electrolyte and having a hermetically sealed cover, a filling tube extending through the cover to the normal electrolyte level, a vent passage including a vent opening in a wall of said filling tube communicating with the space under said cover above the electrolyte, a tubular valve member within said filling tube provided with threads adapted to be engaged by a threaded actuating member to lift said valve member, said valve member being biased by its own weight to a lower position in which said vent passage is closed and being movable within said tube to an upper position in which said vent passage is open, projections on the inner wall of said filling tube adapted to be engaged by said valve member to define said lower position of said valve member, and means depending from said valve member adapted to engage said projections on said filling tube to prevent axial rotation of said valve member and to permit but limit the upward movement of said valve member so as to define said upper position of said member, said last-mentioned means being deformable so that, after assembly of said valve member in said filling tube, it can be moved to a position to engage said projections as aforesaid.

2. In a storage battery cell containing electrolyte and having a hermetically sealed cover, a filling tube extending through said cover to the normal electrolyte level, a vent passage including a vent opening in a wall of said filling tube communicating with the space under said cover above the electrolyte, a tubular valve element mounted within said filling tube having a portion adapted to close said vent passage, said vent element having an internally threaded opening adapted to receive a valve-actuating member to move said valve from a lower non-venting position in which said vent passage is closed by said portion of said valve to an upper venting position, and an integrally formed portion projecting downwardly from said valve element and having vertical and horizontal surfaces adapted to co-operate with a portion of said filling tube to oppose rotation and limit the upward movement of said valve within said opening, said downwardly projecting portion being deformable so as to permit assembling said valve element in said filling tube.

3. In a storage battery cell containing electrolyte and having a sealed cover, a filling tube extending through the cover to the normal electrolyte level, a vent passage including a vent opening through the tube wall communication with the space under said cover and above the electrolyte, a tubular internally threaded valve member within said filling tube, said valve member being biased by its own weight to a lower position in which it closes said vent passage and being movable within said tube to an upper position in which said vent passage is open, means on the inner surface of said filling tube adapted to be engaged by said valve member to define said lower position of said valve member, means depending from said valve member adapted to engage said means on said filling tube to prevent rotation of said valve member and to permit but limit the upward movement of said valve member so as to define its upper position, said last-mentioned means being deformable so as to permit assembly of said valve member in said filling tube, and a vent plug associated with said filling tube having an externally threaded portion adapted to engage said internally threaded portion of said valve member to cause said valve member to be raised to said upper position as said vent plug is turned in the direction to tightly close said filling tube.

4. In a storage battery cell containing electrolyte and having a sealed cover, a filling tube extending through the cover to the normal electrolyte level, a vent passage including a vent opening in the wall of said tube communicating with the space under said cover and above the electrolyte, a tubular metal valve member within said filling tube biased downwardly by its own weight to a position in which said vent passage is closed by said valve member, a projection within said filling tube for limiting the downward movement of said valve and thereby defining said vent-closing position of said valve, a downwardly extending deformable portion integrally formed on said valve, said portion being constructed and arranged to be deformed so as to permit insertion of said valve in said filling tube and after insertion to be pressed outwardly to engage the under side of said projection to limit the upward movement of said valve and thereby define an upper position of said valve in which said vent passage is open.

5. In a storage battery cell containing electrolyte and having a filling tube extending through the cover and terminating at the normal level of the electrolyte and provided with a vent to the space above the electrolyte and under the cover, a tubular valve of metal arranged in the tube for endwise movement and having a body portion and a deformable depending portion, means for holding the valve against rotary motion and affording freedom of endwise motion, a projection disposed in the path of travel of the body portion of the valve and projecting inward from the face of the curved wall of the tube thereby reducing the internal diameter of the tube, the depending portion of the metal valve being deformable to permit it to pass through the contraction in the tube and to be bent into engagement under the same, the projection thereby serving to permit but limit the endwise movement of the valve in both directions.

6. In a storage battery cell containing electrolyte and provided with a filling structure adapted to prevent over filling by trapping gas in the space under the cover above the normal electrolyte level, said structure including a filling duct defined by walls depending from the under side of the cover and said walls having a vent for the trapped gas opening into said duct, the combination of a tubular valve member adapted for vertical travel in said duct to cover and uncover said vent, said valve member having a deformable portion adapted in one position to permit assembly of said valve member in said duct and by deformation from said position after assembly to permit but limit the upward travel of said valve member by engagement with a portion of said wall.

7. In a storage battery cell containing electrolyte and provided with a filling structure adapted to prevent overfilling by trapping gas in the space under the cover above the normal electrolyte level, said level determined by the walls of a filling duct extending down to said level, the combination of a vent for releasing the gases trapped in said space, a tubular valve member adapted to move axially of said duct to open and close said vent, said valve member having a deformable portion adapted in one position to permit assembly of said valve member in said structure and by deformation from said position after assembly to permit but limit the axial travel of said valve by engagement with a relatively fixed portion of said structure.

8. In a storage battery cell containing electrolyte, a filling and venting structure of the type adapted to prevent overfilling by the trapping of gases in the space under the cover above a normal electrolyte level, said structure comprising walls defining a passageway through the cover and terminating at the normal electrolyte level, a vent plug for closing the upper end of said passageway, a vent for releasing trapped gases into a portion of said passageway adjacent its upper end, a tubular valve member adapted to be moved axially to open and close said vent, cooperating projections on said valve member and on a stationary portion of said structure for restricting the movement of said valve member to only limited axial travel relative to said passageway, one of said projections having a deformable portion adapted to pass over its cooperating projection during assembly and to be deformed thereafter to engage said cooperating projection to limit axial travel of said valve in at least one direction, said valve member having means adapted to be engaged by said vent plug to cause axial travel of said valve in the vent opening direction when said plug is moved in a direction to close said filling passageway.

JOSEPH LESTER WOODBRIDGE.